United States Patent [19]

Bardeen

[11] Patent Number: 4,828,114

[45] Date of Patent: May 9, 1989

[54] PUMPKIN CARVING KIT

[75] Inventor: John P. Bardeen, Denver, Colo.

[73] Assignee: Pumpkin, Ltd., Denver, Colo.

[21] Appl. No.: 91,436

[22] Filed: Aug. 31, 1987

[51] Int. Cl.$^4$ ............................................. B65D 69/00
[52] U.S. Cl. ..................................... 206/575; 206/232; 206/472
[58] Field of Search .................... 30/1, 113.1, 113.2, 30/113.3, 144, 286, 289, 301, 315, 316, 304, 358, 517; 33/12, 17; 206/223, 232, 234, 472, 574, 575; 211/70.6, 70.7; 24/158 R

[56] References Cited

U.S. PATENT DOCUMENTS

| | | | |
|---|---|---|---|
| 1,187,842 | 6/1916 | Kaas | 30/144 |
| 2,017,895 | 10/1935 | Davey | 30/517 |
| 2,213,135 | 8/1940 | Ferguson | 30/517 |
| 2,257,002 | 9/1941 | Freeman et al. | 24/158 R |
| 2,330,457 | 9/1943 | Tremblett | 206/472 |
| 2,545,237 | 3/1951 | Maby | 30/301 |
| 2,990,615 | 7/1961 | Ohler | 30/316 |
| 3,840,113 | 10/1974 | Bartleson | 206/232 |
| 3,965,574 | 6/1976 | Graves | 30/289 |
| 4,296,659 | 10/1981 | Nauman | 30/316 |
| 4,689,885 | 9/1987 | Albanese | 30/301 |

Primary Examiner—Jimmy G. Foster
Attorney, Agent, or Firm—Timothy J. Martin; J. Preston Oxenham

[57] ABSTRACT

A pumpkin carving kit includes first and second sets of different types of cutting tools, preferably drill elements and saw elements, at least one pattern sheet having a decorative design and an instruction book having first instructions for securing the pattern sheet and transferring the design onto the surface of the pumpkin, second instructions for using the first set of cutting tools on selected design features and third instructions for using the second set of cutting tools on other selected design features. The instruction book mounts an envelope that receives the tool sets which are organized on a tree. Preferably, a plurality of differently sized pattern sheets are included and are each provided with cut lines for slits allowing slit-adjacent portions to overlap whereby the shape of the pattern sheet conforms to the round shape of the pumpkin.

19 Claims, 3 Drawing Sheets

PUMPKIN CARVING KIT

BACKGROUND OF THE INVENTION

The present invention is directed to a pumpkin carving kit useful for carving decorative designs in the fleshy shell of a pumpkin. The kit includes a combination of tools, decorative patterns and an instruction book containing instructions that correlate design features of the pattern to the cutting tools.

Pumpkin carving has long been one of the several ways in which Halloween is celebrated. Traditionally, pumpkin carving involves the removal of a portion of the pumpkin shell surrounding the stem, removal of the seeds and fibers contained in the pumpkin and carving humorous, grotesque or other decorative features in the pumpkin shell by removing fleshy portions of the shell to obtain the desired appearance. Internal illumination is then provided either by a candle or by a battery-operated light. This illumination results in a glowing decorative pattern.

In the past, pumpkin carving was typically accomplished through the use of pocket knives, paring knives and the like. Due to the size of these cutting instruments, though, the typical carver was only able to obtain crude decorative features. Since the cutting knives used in pumpkin carving are difficult to control, any attempt at carving detailed, intricate design features usually met with failure since the carver often unintentionally removed portions of the pumpkin shell which destroyed the design.

The development of intricately carved pumpkin designs is believed to originated with Paul John Bardeen, the father of the inventor of the present pumpkin carving kit. His innovation used small hand-held saws and spiral drill bits to produce intricately and exotically carved pumpkins. The present invention is directed to an improvement over this early system, and the presentation of improved cutting tools and materials in a kit form for carving pumpkins.

SUMMARY OF THE INVENTION

It is an object of the present invention to provide a new and useful pumpkin carving kit containing all elements necessary for carving intricate designs in pumpkins.

It is another object of the present invention to provide a pumpkin carving kit that is self-contained and packaged in a unique and non-obvious manner for point of purchase display and sale.

To accomplish these objects, a pumpkin carving kit is provided which is adapted for use in carving decorative designs in the fleshy shell of a pumpkin. The carving kit broadly comprises, in combination, a first set of cutting tools each having a first handle exially supporting a first type of cutting element, a second set of cutting tools each having a second handle axially supporting a second type of cutting element different from the first type, a pattern sheet having a decorative design including design features to be carved into the shell of the pumpkin and an instruction book having first instructions for removably securing the pattern sheet to the pumpkin and for transferring the decorative design thereof, second instructions correlating first ones of the design features to the first type of cutting elements and third instructions correlating second ones of the design features to the second cutting elements.

In the preferred embodiment of the present invention, this carving kit is in the form of a self-contained instruction book which has a plurality of leaves bound together along a spine and which may be opened and closed. An envelope is located between front and rear gatherings of the book and is bound along the spline at a first edge portion. The envelope forms a pocket having an interior that may be closed by a closure flap which moves into a folded position with respect to the pocket. A plurality of pattern sheets are detachably bound in the instruction book and are each preferably provided with a decorative design. Cutting tools, preferably in the form of small saws and drills are received in the pocket portion of the envelope with the closure flap operative in the folded position to retain the cutting tool; the leaves of the instruction book in the closed position are operative to hold the closure flap in the folded position.

Preferably, the drill elements are integrally molded plastic pieces having a handle portion and a drill element extending axially thereof. The saw elements are preferably formed by loose saw blades and at least one pair of complementary handle sections which may be secured together to mountably receive the saw blades in an axial position. Preferably, there is a pair of handle sections for each saw blade so that the saw blades are in one-to-one correspondence, and the instruction book contains instructions for assembling the saw elements. The drill elements and the handle sections may be releaseably connected together in a flat tree arrangement sized for insertion in the pocket portion. The tool set may also include a corsage pin that has a protective sleeve on its piercing point. Some of the pattern sheets may be a single leaf size, but other of the pattern sheets may be oversized and folded into a single leaf-sized dimension. The pattern sheets include cut lines extending inwardly from a peripheral margin of the decorative design such that the cut lines are adapted to be pre-cut before the pattern sheet is secured to the pumpkin thereby providing a plurality of slits forming overlapped portions whereby the pattern sheet may be conformed to the rounded surface of the pumpkin.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention is directed to a pumpkin carving kit which provides all the necessary elements and correlated instruction for the intricate and exotic carving of a pumpkin, especially for Halloween. As such, the kit according to the present invention includes the tools and patterns necessary for a person to carve through the fleshy shell of a pumpkin so as to remove portions corresponding to the decorative design whereby the pumpkin may be internally lit to provide a desired glowing pattern.

Figure 1:
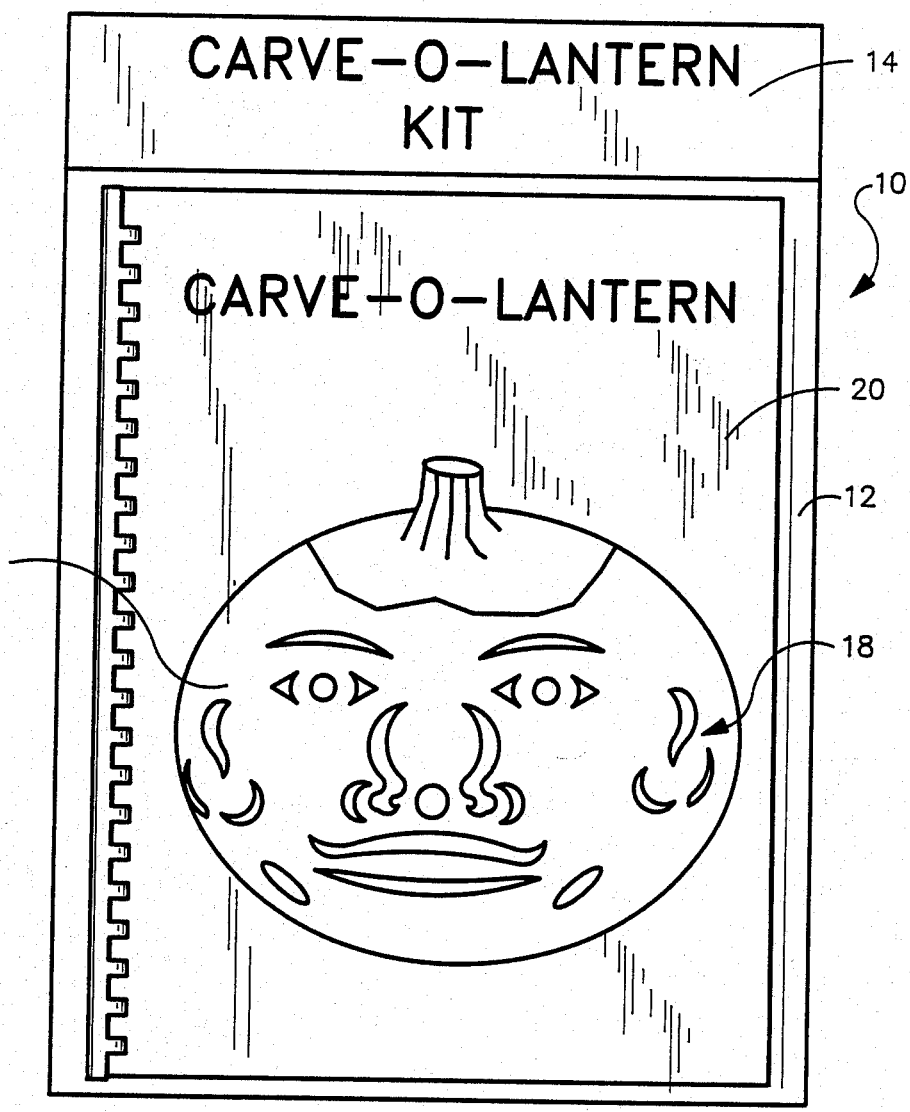
FIG. 1 is a front plan view of a packaged pumpkin carving kit according to the present invention.

As is shown in FIG. 1, then, pumpkin carving kit 10 is shown in its packaged form including an instruction book 20 received in a clear plastic bag 12 provided with a header 14 displaying the trademark CARVE-O-LANTERN, under which the pumpkin carving kit is sold by the assignee of the present invention, Pumpkin, Ltd., of Denver, Colo. As is shown in FIG. 1, instruction book 20 shows a decoratively carved pumpkin 16 having an intricately carved design 18. Thus, kit 10 presents a pleasing appearance for point of purchase display and sale.

Figure 2:
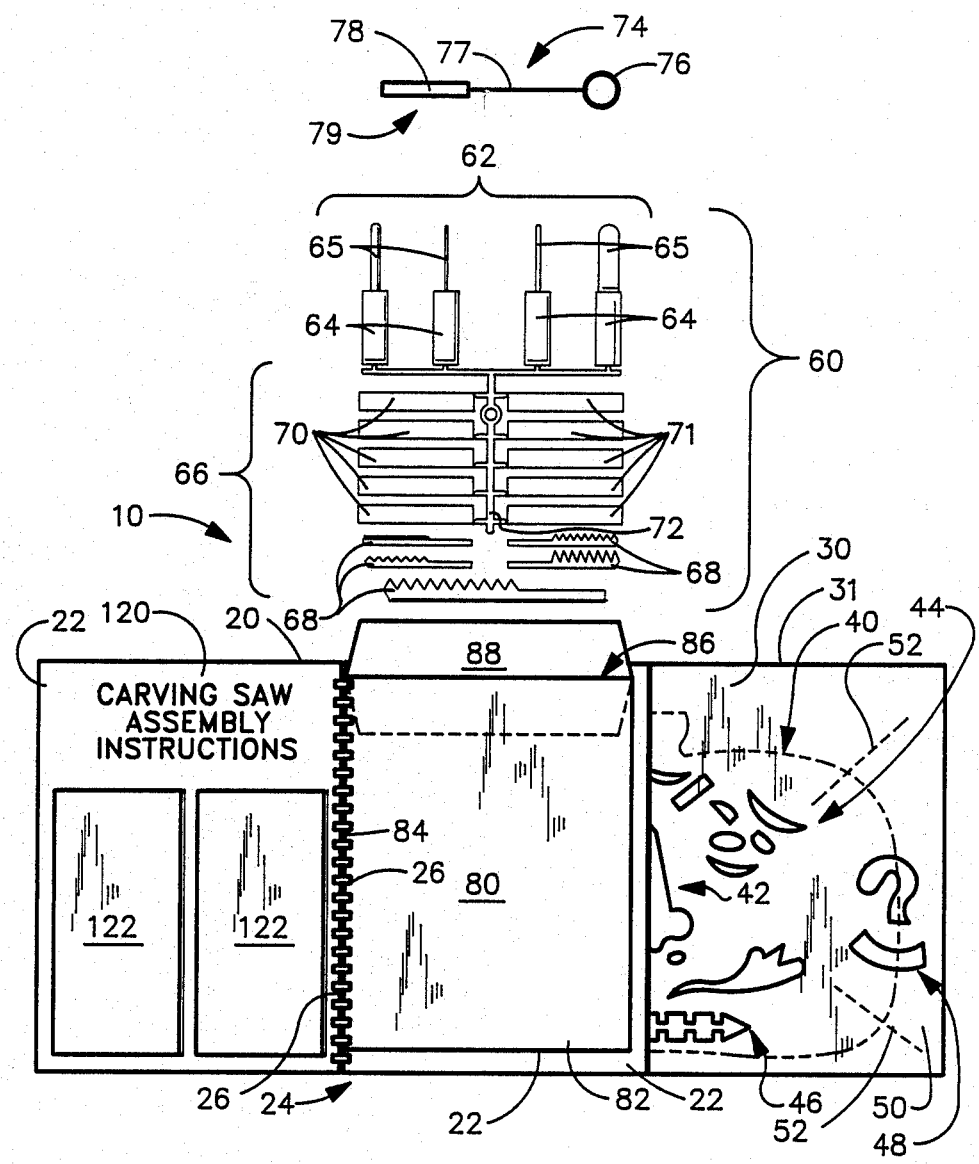
FIG. 2 is a front exploded view showing the various elements of the pumpkin carving kit according to the present invention.
Figure 3:
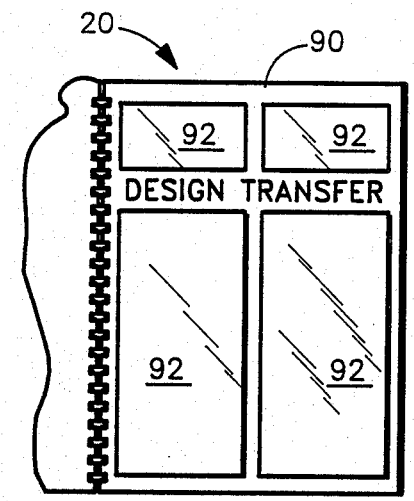
FIG. 3 is a front plan view of a design transfer instruction sheet according to the present invention.
Figure 4:
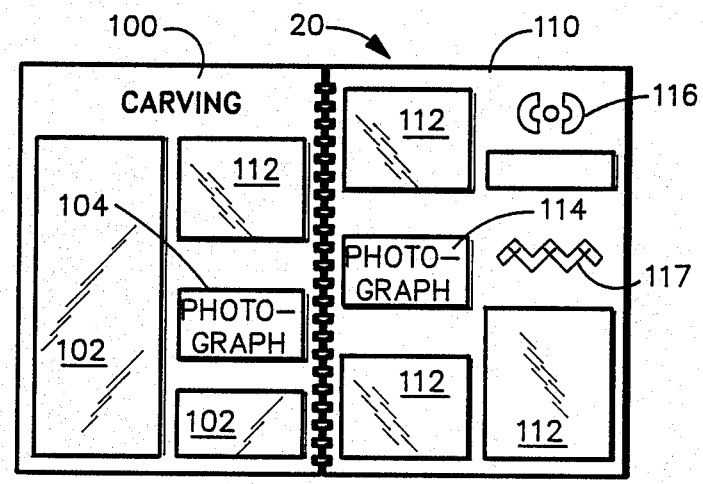
FIG. 4 is a front plan view of carving instruction sheets according to the present invention.
Figure 5:
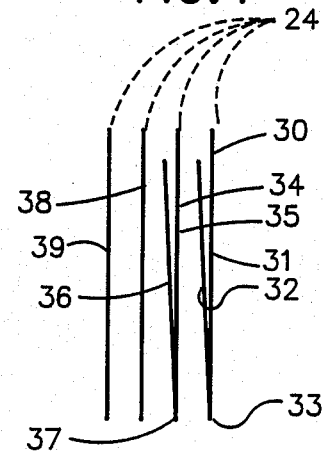
FIG. 5 is a top diagramatic view showing a plurality of pattern sheets according to the present invention.

Pumpkin carving kit 10 is best shown, however, in FIGS. 2-5. Here, it may be appreciated that pumpkin carving kit 10 includes instruction book 20, one or more patterns such as pattern 30, an ensemble of tools 60, and an envelope 80. With greater detail, as is shown in FIG. 2, instruction book 20 includes a plurality of leaves 22 which are bound together at location 24 to form spine 26. A plurality of patterns, such as patterns 30, 34, 38, and 39, shown in FIG. 5, are also bound at location 24 of spine 26. As is shown in FIG. 5, pattern 30 is folded at 33 to provide a first section 31 that is bound at location 24 and a second section 32 so that pattern sheet 30 has a leaf-size dimensioned the same as leaf 22. Similarly, a second enlarged pattern 34 is formed of a first section 35 and a second section 36 folded at 37 so that pattern sheet 34 has the same size as each leaf 22. Pattern sheeets 38 and 39 are smaller in dimension than pattern sheets 30 and 34 so that they each comprise a single section sized the same as each leaf 22.

Each pattern sheet 30, 34, 38 and 39, is printed with a decorative pattern and is detachable from instruction book 20. By way of example, pattern 30 is shown in FIG. 2 and includes a design 40 having a plurality of design features such as nose features 42, eye features 44, mouth features 46, and ear features 48. It should be appreciated that only one half of design 40 is shown since FIG. 2 exposes sheet section 32 with sheet section 31 being hidden by rear gatherings of leaves 22. However, the hidden portion of design 40 is a mere image of that shown in FIG. 2. It should further be understood that pattern sheet 30 has a peripheral margin 50 and that a plurality of cut lines 52 extend inwardly from peripheral margin 50. Cut lines 52 are adapted to be pre-cut so that pattern sheet 30 may take on a rounded shape with portions of sheet 30 adjacent the resulting slit being overlapped on each other.

Tool ensemble 60 is also best shown in FIG. 2. Here, tool ensemble 60 includes a first set of tools 62 in the form of drills, with each drill 62 having a handle portion 64 and a drill element 65 extending axially from its respective handle 64. A second set of cutting tools is provided in the form of saw elements 66. Saw elements 66 are formed by saw blades 68 and pairs of handle sections 70 and 71. Each pair of handle sections 70 and 71 are adapted to be secured together to mount one of saw blades 68 so that a respective saw blade 68 projects axially of the handle formed by a pair of handle sections 70 and 71. Accordingly, it is desired that blades 68 and handle sections 70, 71 be in one-to-one correspondence, as is shown in FIG. 2. Further, it should be appreciated that drill 62 and handle sections 70, 71 are releaseably connected together by tree 72 so that they present a flat, tree arrangement, also as is shown in FIG. 2. Tool set 60 is completed by means of corsage pin 74 having an enlarged head 76 and a needle portion 77. A small protective sheath 78 extends around the piercing point region 79 of corsage pin 70 for packaging and safety. Corsage pin 70 is used to transfer a selected design onto the pumpkin to be carved.

As noted above, envelope 80 is mounted within instruction book 20. To this end, envelope 80 has a pocket portion 82 and is bound along edge 84 to spine 26. Pocket portion 82 has an interior 86 which may be closed by a closure flap 88 which extends from pocket portion 82. Closure flap 88 is shown in the extended or open position in FIG. 2 but may be moved to a folded, closed position as is shown in phantom in that figure. Tool set 60 is adapted to be inserted into interior 86 of pocket portion 20 so that it should be appreciated that tree 72 with its attached pieces is sized for insertion as a unit into pocket portion 82. Flap 88 is then folded into the folded position to retain tool set 60 therein.

Instruction book 20 includes a plurality of leaves which are correlated to various other elements of carving kit 10. As is shown in FIG. 3 instruction book 20 includes a leaf 90 which is provided with design transfer instructions 92 which are correlated to each pattern sheet, such as sheets 30, 34, 38 and 39, and include first instructions 92 for removably securing a selected pattern sheet to the pumpkin and for transferring the decorative design, such as design 40, onto an outer surface portion of the pumpkin by means of concurrently puncturing the pattern sheet and the pumpkin by corsage pin 74. Instruction book 20 is shown in FIG. 4 to have a leaf 100 containing second carving instructions 102 which are correlated to drills 62 and which correlate some of the design features to the drill elements so as to instruct the user on how to use the drill element for cutting a specific type of design feature. This may be further illustrated by means of photograph 104. Another leaf 110 is shown in FIG. 4 and includes third carving instructions such as instructions 112 which are correlated with saw elements 66. Instructions 112 correlate additional design features to the saw elements to instruct a person on how to carve these additional design features with saw elements 66. This procedure may be further illustrated by means of photograph 114 and by means of diagrams such as diagram 116 and diagram 117. Instruction book 20 may also be provided with a leaf such as leaf 120 shown in FIG. 2, which includes fourth instructions in the form of tool assembly instructions 122 which are operative to instruct the assembly of saw blades 68 and handle sections 70, 71 to produce the second set of cutting tools in the form of saw elements 66.

It may be appreciated from the foregoing, that took kit 10 is assembled by placing tool ensemble 60 in interior 86 of envelope 80 and folding closure flap 88 into the closed position shown in phantom in FIG. 2. Each of the enlarged pattern sheets, such as sheets 30 and 34, are folded as shown in FIG. 5. Instruction book 20 is then closed so that the front and rear gatherings of leaves 22 are operative to hold the closure flap 88 in the closed position thereby preventing tool ensemble 60 from falling out of pocket portion 82. The assembled kit contained within instruction book 20 is then placed into clear bag 12 and header 14 is attached for sale.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A carving kit adapted for use in carving decorative designs in the fleshy shell of a pumpkin, comprising in combination:
   a first set of cutting tools each having a first handle axially supporting a first type of cutting element suitable for carving features of a first nature;
   a second set of cutting tools each having a second handle axially supporting a second type of cutting element different from said first type of cutting element and suitable for carving features of a second nature;
   a pattern sheet having a decorative design including design features to be carved into the shell of the pumpkin; and
   an instruction book including first instructions for removeably securing the pattern sheet to the pumpkin and for transferring the decorative design onto an outer surface portion thereof, second instructions correlating design features of said first nature to said first set of cutting elements and third instructions correlating design features of said second nature said second set of cutting elements whereby a person may transfer the decorative design onto the outer surface portion of the pumpkin and subsequently remove selected portions of the fleshy shell corresponding to the design features with said first and second sets of cutting elements respectively so that intricate and exotic decorative design comprising features of both the first and second nature may be carved.

2. A carving kit according to claim 1 further comprising in combination an envelope having a pocket portion and a closure flap, said envelope bound in said instruction book along one edge of said pocket portion whereby said first and second sets of cutting tools may be packaged therein.

3. A carving kit according to claim 1 further including in combination a corsage pin, said first instructions being correlated to the corsage pin.

4. A carving kit according to claim 3 wherein said corsage pin is provided with a removeably protective sleeve on a piercing point portion thereof.

5. A carving kit adapted for use in carving decorative designs in the fleshy shell of a pumpkin, comprising:
   an instruction book which may be opened and closed, said instruction book having a plurality of leaves bound together along a spine;
   an envelope having a pocket portion with an interior and a closure flap moveable betwen an extended position allowing access to the interior of the pocket portion and a folded position to close the interior of the pocket portion, said envelope bound in said instruction book along one edge of said pocket portion;
   a plurality of pattern sheets each having a decorative design including design features to be carved in the shell of the pumpkin, said pattern sheets each detachably bound in said instruction book; and
   cutting tools received in said pocket portion of said envelope, said closure flap operative in the folded position to retain said cutting tools, front and rear gatherings of the leaves of said instruction book when closed operative to hold said closure flap in the folded position.

6. A carving kit according to claim 5 wherein said cutting tools include drill elements and saw elements.

7. A carving kit according to claim 6 wherein said instruction book has first instructions for removeably securing a selected pattern sheet to the pumpkin and for transferring its decorative design onto an outer surface portion of the pumpkin, second instructions correlating first ones of the design features of the selected pattern to the drill elements and third instructions correlating second ones of the design features of the selected pattern to the saw elements whereby a person may transfer the decorative design of the selected pattern onto the outer surface portion of the pumpkin and subsequently remove selected portions of the fleshy shell corresponding to the first and second ones of the design features with said drill elements and saw elements, respectively.

8. A carving kit according to claim 7 wherein said saw elements include a plurality of saw blades and at least one pair of complementary handle sections operative to fit together and mountably receive the saw blades to construct the saw elements for use.

9. A carving kit according to claim 8 wherein said saw blades are in one-to-one correspondence with pairs of handle sections, said instruction book having fourth instrucctions for assembling said saw elements out of a respective saw blade and pair of handle sections.

10. A carving kit according to claim 9 wherein said drill elements and said handle sections are releaseably connected together in a flat tree arrangement sized for insertion into said pocket portion.

11. A carving kit according to claim 6 wherein said cutting tools include a corsage pin.

12. A carving kit according to claim 5 wherein some of said pattern sheets including a plurality of said pattern sheets detachably bound in said instruction book, some of said pattern sheets being single size leaves in said instruction book and other of said pattern sheets being oversized leaves in said book and folded to a single leaf size dimension.

13. A carving kit according to claim 12 wherein said surface portion is rounded, said pattern sheets each including cut lines extend inwardly from a peripheral margin of the decorative design, said cut lines adapted to be pie-cut before the pattern sheet is secured to the pumpkin to provide a pluality of slits whereby portions of the pattern sheet adjacent each said slit may be overlapped to conform the shape of the pattern sheet to the rounded surface portion of the pumpkin.

14. A carving kit adapted for use in carving decorative designs in the fleshy shell of a pumpkin, comprising in combination:
   a first set of cutting tools each having a first handle axially supporting a first type of cutting element said first handles and said first type cutting elements releasably connected together in a flat tree arrangement;
   a second set of cutting tools each having a second handle axially supporting a second type of cutting element different from said first type of cutting element;
   a pattern sheet having a decorative design including design features to be carved into the shell of the pumpkin; and
   an instruction book including first instructions for removeably securing the pattern sheet to the pumpkin and for transferring the decorative design onto an outer surface portion thereof, second instructions correlating first ones of the design features, to the first type of cutting elements and third instructions correlating second ones of the design features to the second type of cutting elements whereby a person may transfer the decorative design onto the outer surface portion of the pumpkin and subseqnetly remove selected portions of the fleshy shell corresponding to the first and second ones of the design features respectively with said first and second types of cutting elements.

15. A carving kit according to claim 14 wherein said first type of cutting elements are drills and second type of cutting elements are saws.

16. A carving kit according to claim 15 wherein said second set of cutting tools includes pairs of handle sections and saw blades each adapted to be mountably received and retained by a respective pair of handle sections.

17. A carving kit according to claim 16 wherein said instruction book includes fourth instructions for assembling said second set of cutting tools.

18. A carving kit adapted for use in carving decorative designs in the fleshy shell of a pumpkin, comprising in combination:
a first set of cutting tools each having a first handle axially supporting a first type of cutting element;
a second set of cutting tools each having a second handle axially supporting a second type of cutting element different from said first type of cutting element; and
a plurality of pattern sheets having a decorative design including design features to be carved into the shell of the pumpkin said pattern sheets detachably bound in an instruction book, some of said pattern sheets being single sized leaves in said instruction book and other of said patterns being oversized leaves in said book and folded to a single leaf size dimension said instruction book including first instructions for removeably securing at least one of said pattern sheets to the pumpkin and for transferring the decorative design onto an outer surface portion thereof, second instructions correlating first ones of the design features to the first type of cutting elements and third instructions correlating second ones of the design features to the second type of cutting elements whereby a person may transfer the decorative design onto the outer surface portion of the pumpkin and subsequently remove selected portions of the fleshy shell corresponding to the first and second ones of the design features respectively with said first and second types of cutting elements.

19. A carving kit according to claim 21 wherein said surface portion is rounded, said pattern sheets each including cut lines extend inwardly from a peripheral margin of the decorative design, said cut lines adapted to be pre-cut before the pattern sheet is secured to the pumpkin to provide a pluality of slits whereby portions of the pattern sheet adjacent each said slit may be overlapped to conform the shape of the pattern sheet to the rounded surface portion of the pumpkin.

* * * * *